June 11, 1963
M. G. ZAVERTNIK
3,093,703
EXPANSION FITTING FOR ELECTRICAL CONDUITS
Filed Nov. 7, 1960
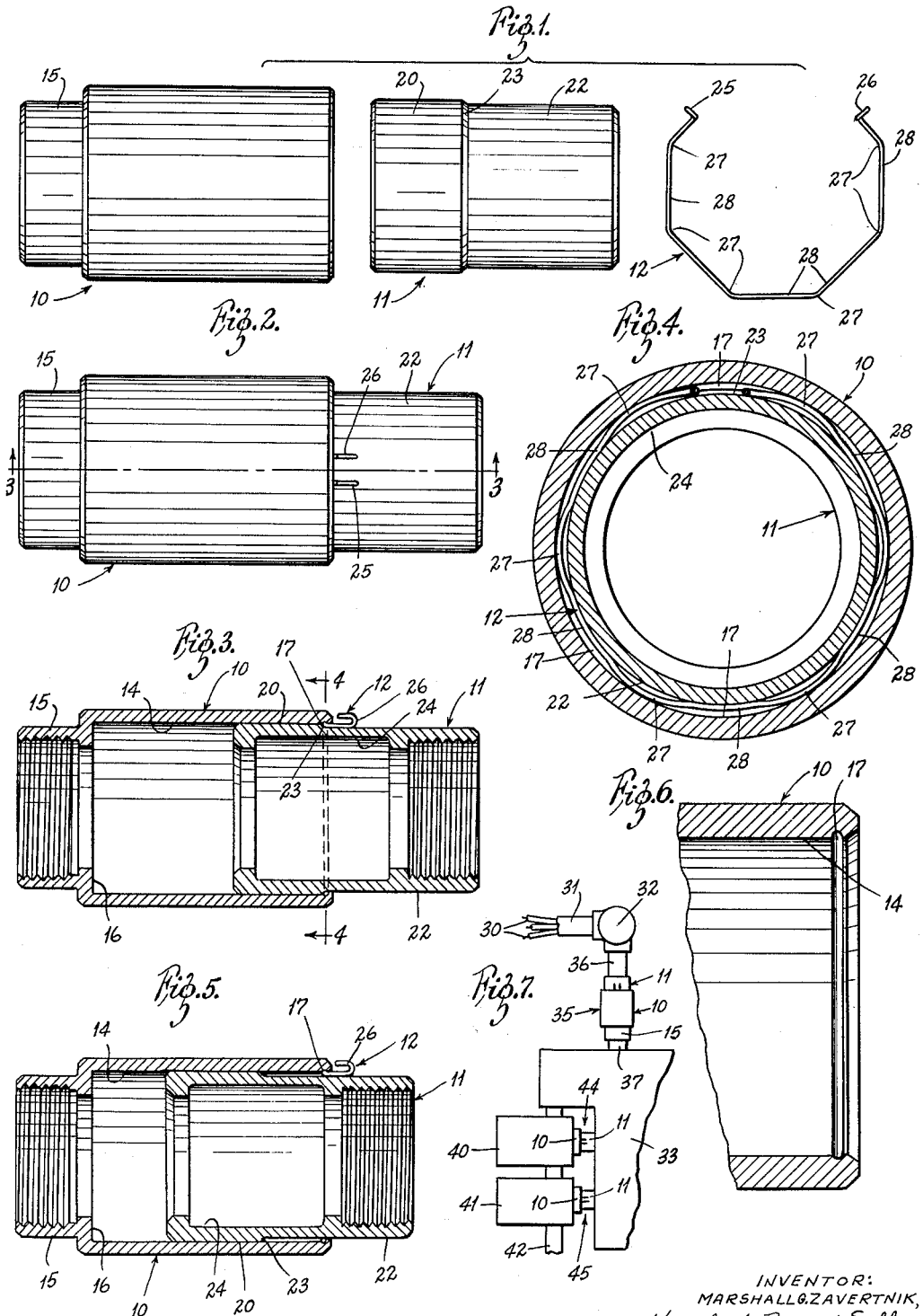
INVENTOR:
MARSHALL G. ZAVERTNIK,
By Kingsland, Rogers & Ezell
ATTORNEYS

United States Patent Office 3,093,703
Patented June 11, 1963

3,093,703
EXPANSION FITTING FOR ELECTRICAL CONDUITS
Marshall G. Zavertnik, St. Louis, Mo., assignor to Killark Electric Manufacturing Company, St. Louis, Mo., a corporation of Missouri
Filed Nov. 7, 1960, Ser. No. 67,824
4 Claims. (Cl. 174—86)

The present invention relates to an expansion fitting, such as is principally used for containing electrical conductors. It is of the type used between two lengths of conduit or electrical containers to enclose the wiring connecting them. Its principal objects are to accommodate variations of the distance between the electrical containers by inaccuracies of installation, expansion, and the like, as well as to enable them to be detached from their mountings with minimum difficulty.

It is a particular object of the invention to provide a coupling of two separable parts, that may be assembled and taken apart in the field as well as in its manufacturing plant, and which accommodates substantial variations in the distances between the two objects the fitting connects.

A further object is to provide a separable coupling or fitting of this type that will prohibit the existence of flame paths leading out from inside the conduit. An additional object is to seal off conduits that might conduct explosive gases, dust, etc., or might admit flame to hazardous locations containing such gases or dust.

The fitting comprises two telescopic members, with complementary outer and inner surfaces, respectively. These surfaces are of sufficient axial extent to provide smooth sliding fit between the elements without permitting flame paths between them from the inside to the outside of the coupling. The two surfaces represent the minimum diameter of the outer telescopic element and the maximum diameter of the inner element, respectively, at their open ends, so that the inner element may be freely inserted into and withdrawn from the outer one. Beyond the bearing surface portion on the inner telescopic element, the element has a portion of reduced diameter, with a shoulder between the two portions. The outer element has a recess that receives a removable, yieldably-expanding, spring clip, shaped to extend radially inward from the surface of the outer element, so as yieldably to engage the reduced surface portion of the inner member and to slide over it as the elements telescope, and also to engage the shoulder to prevent the two elements from being pulled apart. The outer element has an opposite shoulder at the closed end of its telescopic surface, that limits movement of the inner element into the outer one.

A feature of the invention is that the clip not only acts as a removable stop to prevent undesired separation of the telescopic elements, but also provides electrical contact with both elements at all times, so that it guarantees a permanent "grounding" of the conduits (or other units joined by the fitting) and prevents the insulation of one conduit from the other one. It is accordingly an object of the invention to provide a ground element that eliminates a ground strap for each conduit section.

Other objects of the invention will appear from the description to follow.

In the drawings:
FIGURE 1 is an exploded view of the three components of the present fitting;
FIGURE 2 is an elevation of the elements assembled together;
FIGURE 3 is an axial section taken on the line 3—3 of FIGURE 2 showing the telescopic elements extended;
FIGURE 4 is a transverse section taken on the line 4—4 of FIGURE 3;
FIGURE 5 is a section similar to FIGURE 3 but showing the telescopic elements partially collapsed together indicating a shortening of the distance between the conduits;
FIGURE 6 is a fragmentary view of the inside of the outer sleeve element with its spring-clip retainer groove; and
FIGURE 7 is a diagrammatic illustration of the fitttings in use.

The fitting comprises, generally speaking, an outer female telescopic element 10, an inner male telescopic element 11, and a spring clip 12. The outer element 10 is tubular with a smooth inner wall 14. The attaching end 15 of the tubular element 10 is of reduced diameter and has connecting means illustrated as internal threads. This end portion 15 affords a shoulder 16 for a purpose to appear. The threads are merely illustrative of forms of connections that may be used, either of the internal or the external type. The opposite, or open, end of the element 10 has a spring clip retaining groove 17 around the end of the inner wall 14.

The inner telescopic element 11 of the fitting is provided with an outer surface 20 that is complementary to the surface 14 and preferably in the form of a circular cylinder. The surfaces 14 and 20 are designed to telescope together with a close fit; and in an average conduit size of up to 4″ diameter, the maximum clearance between the two surfaces 14 and 20 should be about .0033″ on the diameters. The surface 20 will have a substantial axial dimension (usually at least one inch) to insure the absence of flame paths. The surface 14 is about twice as long, axially, as illustrated, so that the maximum expansion may be in the range of about one inch, in the size shown. These dimensions are not intended to be critical, but are intended to illustrate the nature of an embodiment of the invention.

The member 11 has its outer diameter reduced at its closed or connector end, beyond the surface 20, as shown at 22, providing a shoulder 23. The connecting end of the member 11 is shown as having internal threads for engagement with complementary threads on the conduit. As illustrated, the threads on the two members 10 and 11 have the same diameter, but it will be understood that other types of connections may be used, and that they do not have to be of the same diameter.

The member 11 may be recessed at 24 to receive sealing compound and retain it in place.

The spring clip 12 is made of steel spring wire. It is multisided as illustrated, and has its ends formed with out-turned ears 25 and 26. Its shape is such as to give it corners 27 that can retain it in the groove 17, and chord-like stretches 28 that project radially inwardly far enough to yieldably engage the outer surface 22 of the inner member, as will appear.

In assembling the fitting, the inner element 11 is slipped into the outer member 10 in the manner illustrated, until the shoulder 23 is inward beyond the groove 17, as illustrated in FIGURES 3 and 5. The spring clip 12 is placed around the outer member 11, and its ears 25 and 26 are squeezed together until the spring clip can be slipped into the outer element 10 between the surfaces 22 and 14, until its normal expansion causes it to engage its corners 27 within the groove 17. Then the ends 25 and 26 may be released, whereupon the spring clip is retained in the groove 17. All the while the spanning stretches 28 of the clip tightly engage the surface 22 of the inner member. Thus the clip acts as a removable abutment preventing the elements 10 and 11 from extending beyond the position illustrated in FIGURE 3, and also provides electrical contact between the elements 10 and 11. These members are prevented from excess collapsing by engagement of the free end of the inner member 11 against the shoulder 16 of the outer member 10.

FIGURE 7 illustrates several of the fittings in use. Incoming wires are diagrammatically shown at 30, entering through a conduit 31 to a terminal box 32. They are to be led from the box 32 to a panel board 33. In order to eliminate the necessity of accommodating close tolerances between the fixed box 32 and the panel 33, the conduits between the box and the panel board may include an expansible fitting 35 such as herein described, interposed between two conduits 36 and 37. In this showing, the inner telescopic element 11 is secured to the upper conduit 36. The outer element is applied over the inner one and the clip applied. The outer element is then secured to the lower conduit 37 leading from the panel box.

If desired, sealing compounds may be placed in the element 11, filling it around the cables and being retained by the recess 24. If later the cables are disconnected from the apparatus on the panel board, the coupling can be separated without disturbing the inner element 11 and the sealing compound.

FIGURE 7 also shows two switch boxes 40 and 41 mounted on suporting bar 42 that is connected with the panel 33. The present expansible fittings enable these components to be mounted easily, without requiring close tolerances on the distance between the panel and the switch boxes. The box 40 is connected to the panel board box by a fitting 44, and the box 41 connected by a fitting 45.

It is readily understood that the inner elements 11 of the fittings can be connected directly onto the panel board box to enclose the wires leading therefrom to the switch boxes. Sealing compound may be used. The outer elements 10 may be connected to the respective boxes 40 and 41, and engaged over the inner elements and clipped in place. Since the fittings provide adequate fire seal in any operative relationship of the elements 10 and 11, a wide latitude for positioning of the boxes 40 and 41 is permissible.

The separability of the elements is valuable. If a switch 40 or 41 requires replacement, it is only necessary to detach the wires within its box, release the clip 12 from its groove 17, and then remove the entire box. Replacement of the box is easy, because the wires, and the sealing compound, remain undisturbed. The fitting elements can be re-connected upon repair or replacement of the switch.

The description of the uses and the order of assembly and subassembly of the parts is for illustration and is not limiting.

This fitting operably simplifies the assembly of electrical enclosures, as well as their disassembly. Yet it affords good sealing qualities. It can be used in spaces too short for threaded fittings such as nipples, as its release requires only pliers and not a wrench. Its separability adds greatly not only to its conventional uses, as in conduit sections, but also adds many new uses, such as in connection with the attachment of components to one another as illustrated in FIGURE 7.

It will be understood that this expansion fitting can be made in various sizes and of various materials. Usually the tubular parts will be made of metal and preferably of aluminum with a clip made of spring steel to render the fitting electrically conductive to afford the grounding of the conduit system as described.

Various changes and modifications may be made within the process of this invention as will be readily apparent to those skilled in the art. Such changes and modifications are within the scope and teaching of this invention as defined by the claims appended hereto.

What is claimed is:

1. An expansion fitting comprising two elements, one telescoped within the other, and a spring clip for holding them in assembled relationship, each element being tubular and having connecting means at its outer end whereby it may be attached to a conduit or the like, the outer element having an interior bearing surface and the inner element having an exterior bearing surface complementary to the said interior surface, the interior surface on the outer element having a greater axial length than the outer surface of the inner element, whereby the said surfaces may remain in engagement during telescoping of the two elements with respect to each other, the two surfaces having a close fit and the surface on the outer element having a sufficient length to inhibit the formation of flame paths, from inside the elements to the outside thereof, the inner element being reduced in diameter outward of its aforementioned exterior bearing surface, to provide a shoulder between the two surface portions, the inner surface of the outer element adjacent its end having a recess therein; and removable stop means, the same being contractible to fit between the reduced exterior surface on the inner element and the inner surface on the outer element, and then being expandable into said recess to be secured against axial movement relatively to the outer element, whereby to be engageable with the shoulder to limit extension of the two telescopic elements, and the said retaining means having resilient and firm engagement with both elements to establish electrical contact from one element to the other.

2. An expansion fitting for connecting conduits and the like, comprising an outer tubular telescopic element and an inner tubular telescopic element fitting into the outer one, the two elements having complementary slidably engaging surfaces; one of the elements having a second surface portion of different diameter from its slidably engaging surface portion, to provide a space between it and the slidably engaging surface on the other element and a shoulder at the junction of the two surfaces; and an electrically conductive spring clip removably secured to the said other of the elements to be held on said other element against axial movement with respect to it in the space between its slidably engaging surface and the second surface of the said one element, the clip being of a shape to be deformed when placed between the said surfaces, it having portions that extend radially to engage the second surface of the said one element resiliently and yieldably, whereby to provide electrical connection between the two elements in all positions of telescopic adjustment, and to engage the shoulder on the said one element to limit separating movement.

3. The fitting of claim 2, wherein the element to which the clip is secured against axial movement has a transverse groove in it, and the clip has a non-circular shape, whereby the clip is retained in the groove, but extends into engagement with the surface of the other element, to establish the continuous electrical conductivity.

4. The fitting of claim 2 wherein the fitting element to which the clip is secured against axial movement has a transverse groove in it, and the clip comprises a spring wire with its ends turned axially with respect to the tubular elements, and extending beyond the end of the fitting element to which it is attached, whereby to be grasped for contracting and expanding the clip, the clip being engageable in the groove to be retained thereby whereby to restrict its axial movement as aforesaid.

References Cited in the file of this patent
UNITED STATES PATENTS 2,275,762    Norton _____ Mar. 10, 1942
2,900,436    Appleton _____ Aug. 18, 1959